United States Patent [19]

Rosenquist et al.

[11] Patent Number: 4,552,924
[45] Date of Patent: Nov. 12, 1985

[54] COMPATIBILIZATION OF POLYCARBONATE BLENDS

[75] Inventors: Niles R. Rosenquist, Evansville; John A. Tyrell, Mt. Vernon, both of Ind.

[73] Assignee: General Electric Company, Mt. Vernon, Ind.

[21] Appl. No.: 642,093

[22] Filed: Aug. 20, 1984

Related U.S. Application Data

[62] Division of Ser. No. 557,006, Dec. 1, 1983, Pat. No. 4,496,693.

[51] Int. Cl.$^4$ .............................................. C08L 69/00
[52] U.S. Cl. ................................. 525/146; 264/328.1; 264/331.17; 525/130; 525/148
[58] Field of Search ....................... 525/146, 148, 468; 264/331.17, 328.1; 528/196; 524/508

[56] References Cited

U.S. PATENT DOCUMENTS 3,431,224  3/1969  Goldblum .......................... 524/590

Primary Examiner—Theodore E. Pertilla
Attorney, Agent, or Firm—John Schneller; Martin B. Barancik

[57] ABSTRACT

A process of molding a polymer admixture with improved compatability which comprises, preparing an admixture of (i) an aromatic carbonate polymer, (ii) a polyolefin or modified polyolefin in sufficient quantity to impact modify the aromatic carbonate polymer, and (iii) an amount of catalyst sufficient to compatibilize (i) and (ii) selected from the group consisting of basic compounds of alkali or alkaline earth metals and molding said admixture.

11 Claims, No Drawings

COMPATIBILIZATION OF POLYCARBONATE BLENDS

This is a division of copending application Ser. No. 557,006, filed 12/1/83, now U.S. Pat. No. 4,496,693.

FIELD OF THE INVENTION

The invention relates to heterogeneous blends of polycarbonate and polyolefin resins having improved compatibility, and improved physical properties. As used herein, compatibility refers to the ability of two streams of a heterogeneous blend to adhere to each other.

BACKGROUND OF THE INVENTION

Heterogeneous blends of polycarbonate with either polyolefin or modified polyolefin resins are well known and used in a variety of applications because inter alia of their superior impact strength compared to unblended polycarbonate resins. For example, heterogeneous blends of polycarbonate and a variety of polyolefin resins are described in U.S. Pat. No. 3,431,224 to Kenneth B. Goldblum. As described therein, admixtures of polycarbonate including at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether, and a polyurethane elastomer exhibit improved solvent resistance and impact strength.

Nevertheless the heterogeneous blends of polycarbonate and polyolefin resins previously known are difficult to use for molding articles requiring multiple gates. Because the polycarbonate and polyolefin polymers mentioned above are incompatible, molded articles made therefrom using multiple gates frequently failed, often along their weld lines. In addition, prior products made from heterogeneous blends of polycarbonate and polyolefin resins exhibit delamination rendering them unsuitable for many uses.

SUMMARY OF THE INVENTION

Accordingly, it is a principal object of the present invention to improve the compatibility of heterogeneous blends of polycarbonate with either polyolefin or modified polyolefin resins.

Another object of the present invention is to improve the compatibility of heterogeneous blends of polycarbonate with polyolefin or modified polyolefin, and to maintain their impact strength.

An advantage of the present invention is that molded articles made according to the invention exhibit improved resistance to failure along their weld lines.

Another advantage of the present invention is that articles made according to the invention exhibit improved resistance to delamination.

According to the present invention, there is herein disclosed a thermoplastic resin composition, comprising in intimate admixture a polycarbonate, a polyolefin, and a compatibilization catalyst. It has now been found that the addition of a compatibilization catalyst to a heterogeneous blend of a polycarbonate and a polyolefin or modified polyolefin unexpectedly improves the compatibility of the blended mixture, resulting in improved physical properties. Further according to the present invention, there is herein disclosed a method of molding articles of a heterogeneous blend of a polycarbonate, a polyolefin, and a compatibilization catalyst, and the molded articles made by this process.

DETAILED DESCRIPTION OF THE INVENTION

It has now been found that the addition of certain catalysts herein called compatibilization catalysts to a heterogeneous blend of polycarbonate and a polyolefin resin unexpectedly improves the compatibility of the heterogeneous blended mixture. Articles molded from the composition of the present invention, comprising in intimate admixture a polycarbonate, a polyolefin, and a compatibilization catalyst, exhibit superior impact strength, particularly along weld lines. These articles also exhibit improved resistance to delamination. As noted above, the term "compatibility" as used herein means the ability of two streams of a heterogeneous blended mixture to adhere to each other. The term "weld line" as used herein refers to the line along which two streams of a liquid entering a multiple—gated mold meet. The term "delamination" as used herein refers to surface peeling of resin from an article. The term "impact strength" as used herein refers to resistance to breakage by flexural shock of an article. Impact strength on the weld line of a molded article is a good measure of compatibility.

The compatibilization catalysts useful in the present invention are basic compounds including both alkali and alkaline earth oxides, hydroxides, amides, etc. For example, lithium, sodium, potassium, and rubidium compounds are useful compatibilization catalysts; of these lithium compounds are preferred. Calcium, strontium, and barium compounds are also useful as catalysts in the practice of the present invention. Preferred compatibilization catalysts include oxides, hydroxides and amides of lithium, sodium and potassium. Of these lithium oxides, lithium hydroxide, and lithium amide are particularly preferred. The amount of compatibilization catalyst used in the practice of the present invention is an amount effective to cause increased compatibilization. This amount may vary from about 0.1 to about 50 parts per million parts (by weight) of blended polycarbonate and polyolefin resin. When the compatibilization catalyst is one or more lithium, sodium, or potassium compounds, about 0.1 to about 20 parts per million (by weight) are generally used. When the compatibilization catalyst is one or more lithium compounds, which are particularly preferred, about 1 to about 10 parts per million (by weight) are used. For example, when lithium hydroxide is the compatibilization catalyst, about 1 to about 5 parts per million (by weight) of hetergeneous blended resins is generally present.

The heterogeneous blended resins useful in the present invention are blends of polycarbonate with either polyolefin or modified polyolefin resins. For example, heterogeneous blends of resins described in U.S. Pat. No. 3,431,224, incorporated herein by reference, are useful in the present invention. These heterogeneous blends include polycarbonate and at least one polymer from the group including polyethylene, polypropylene, polyisobutylene, a copolymer of ethylene and an alkyl acrylate, and a copolymer of ethylene and propylene; ethylene and other alpha olefins of from 4 to 8 carbon atoms, inclusive; or propylene and alpha olefins of from 4 to 8 carbon atoms, inclusive. These heterogeneous blends are thus blends of a glassy polymer (i.e., polycarbonate) with at least one polymer from the recited list. These polymer blends may be defined as intimate mixtures of at least two kinds of polymers, with no covalent bonds between them.

The polycarbonate resin used in the heterogeneous blends of the present invention is an aromatic carbonate polymer which may be prepared by reacting a dihydric phenol with a carbonate precursor such as phosgene, a haloformate, or a carbonate ester. Generally speaking, such aromatic carbonate polymers may be typified as possessing recurring structural units of the formula:

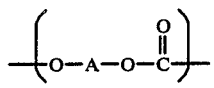

wherein A is a divalent aromatic radical of the dihydric phenol employed in the polymer producing reaction. Preferably, the aromatic carbonate polymers used in the heterogeneous blends of the present invention have an intrinsic viscosity (as measured in methylene chloride in deciliters per gram at 25° C.) ranging from about 0.30 to about 1.00. The dihydric phenols which may be employed to produce such aromatic carbonate polymers are mononuclear or polynuclear aromatic compounds, containing as functional groups two hydroxy radicals, each of which is attached to a carbon atom of an aromatic nucleus. Typical dihydric phenols are:
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dimethoxydiphenyl ether;
and the like.

Other dihydric phenols which are also suitable for use in the preparation of the polycarbonates used in the present invention are disclosed in U.S. Pat. Nos. 2,999,835; 3,038,365; 3,334,154; and 4,131,575. The preferred dihydric phenol is 2,2-bis(4-hydroxylphenyl)propane (bisphenol - A).

These aromatic polycarbonates can be manufactured by known processes, for example and as mentioned above, by reacting a dihydric phenol with a carbonate precursor, such as phosgene, in accordance with the methods set forth in the above-mentioned patent publications, and in U.S. Pat. Nos. 4,018,750 and 4,123,436, or by other processes known to those skilled in the art.

The polyolefin or modified polyolefin resins useful in the present invention are themselves generally well known commercially available thermoplastic resin materials. In general, any polyethylene, whether linear or cross-linked, may be employed to produce the heterogeneous blended resins useful in the present invention. The densities and melt indices of the polyethylenes used are not critical. Similarly, any linear or cross-linked polypropylene may be employed. As in the case of polyethylene, the melt index and the density of the polypropylene useful in the practice of the invention is not critical. The polyiosbutylene polymers useful in the present invention have, in general, molecular weights greater than about 75,000, and preferably molecular weights between about 100,000 and 200,000. Both linear and cross-linked polymers of ethylene and propylene may be useful in the present invention. As in the case of polyethylene and polypropylene, the melt indices and densities of ethylene-propylene copolymers are not critical from the standpoint of their use in accordance with the invention. In the same manner copolymers of ethylene and higher alpha olefins aforementioned or propylene and other aforementioned higher alpha olefins can be employed.

The preferred polyolefin or modified polyolefin resins are copolymers of an olefin and at least one monomeric compound selected from the group consisting of a $C_1$–$C_6$ alkyl acrylate, $C_1$–$C_6$ alkyl methacrylate, acrylic acid, methacrylic acid and a mixture of any of the foregoing.

These preferred resins are made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate; wherein alkyl is one to three carbon atoms, inclusive, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The most preferred copolymer for use in the present invention is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite DPD-6169 ethylene-ethyl acrylate copolymer is suitable for use in the present invention.

The ratio of polyolefin or modified polyolefin to polycarbonate in the heterogeneous blends of the present invention is sufficient to impact and modify the polycarbonate. Such an amount is generally within the range of about 2 to about 15 weight percent, weight percent measured by the total polycarbonate and polyolefin or modified polyolefin. Preferably the quantity of polyolefin or modified polyolefin to polycarbonate is between about 3 and about 12 percent, and most preferably it is between about 6 and about 10 weight percent.

Within the stated components and within the broad composition ranges specified above, many resin mixtures may be prepared in accordance with the subject invention which exhibit improved compatibility and resistance to delamination over prior heterogeneous blends of polycarbonate and polyolefin or modified polyolefin resins. The subject invention provides resin mixtures which after molding exhibit improved impact strength and good weld line strength in comparison with articles from prior heterogeneous blends.

The compositions of the subject invention may be prepared by dry blending the aromatic carbonate polymer resin component, the compatibilization catalyst, and the polyolefin or modified polyolefin component until complete dispersion of all of the ingredients is obtained. The resin mixtures are then extruded and chopped to form pellets and thereafter molded in accordance with conventional methods.

The resistance to impact failure of the polycarbonate resin mixtures prepared in accordance with the subject invention was determined in accordance with the Notched Izod Impact Test, ASTM D256 on molded test specimens in the form of bars of two sizes: $2\frac{1}{2}"\times\frac{1}{2}"\times\frac{1}{8}"$ and $2\frac{1}{2}"\times\frac{1}{2}"\times\frac{1}{4}"$, the latter dimension being the specimen thickness. The test specimens were mounted in accordance with ASTM D256 procedures and were tested at room temperature. Izod impact strengths were determined for all specimens according to ASTM D256 procedures on notched specimens and are reported in ft.lb/in. of notch.

The term double gate (DG) or weld line strength is used in the examples to report the weld line strength of samples prepared in a double gate mold which have been tested according to ASTM D256. Values are reported in ft. lbs. The superscripts for the impact data in the examples refer to the percent ductility of the samples. The superscript H refers to a hinged break.

Also determined for the heterogeneous blends tested in the Kasha Index (KI) which is an indication or measure of the processability of the resin, i.e., the lower the KI the greater the melt flow rate and, therefore, the better the processability. Basically, the Kasha Index is a measurement of the melt viscosity of the resin. The procedure for determining the Kasha Index is as follows: 7 grams of resin pellets, dried a minimum of 90 minutes at 125° C., are added to a modified Tinius-Olsen T3 melt indexer; the temperature in the indexer is maintained at 300° C. and the resin is heated at this temperature for 6 minutes; after 6 minutes the resin is forced through a 1.0478 mm radius orifice using a plunger of radius of 4.7371 mm and an applied force of 8.04 kilograms; the time required for the plunger to travel 50.8 mm is measured in centiseconds and this is reported as the KI. The higher the KI, the higher the melt viscosity and the more viscous the resin, and, therefore, the more difficult to process.

DESCRIPTION OF THE PREFERRED EMBODIMENTS

In order that those skilled in the art may better understand how the present invention may be practiced, the following Examples are given by way of illustration and not by way of limitation. All parts and percentages are by weight unless otherwise noted.

In Table I, the heterogeneous blend of resins contained 92.5% Lexan-brand polycarbonate with IV of 0.46–0.49 and 7.5% ethylene ethylacrylate, viz. a copolymer of 19% ethylacrylate and 81% ethylene.

In Table II, the heterogeneous blends of resins varied as indicated in the table. In addition to Lexan-brand polycarbonate and ethylene ethylacrylate ("EEA") as described above, examples 4 and 5 also contained polyethylene, high density polyethylene LB742 obtained from USI as indicated.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

TABLE I

| Example | Catalyst (LiOH.H$_2$O) ppm | Notched Izod ($\frac{1}{8}"$ thickness) | Notched Izod ($\frac{1}{4}"$ thickness) | Double Gated Izod | Delamination | Kasha Indices | Melt Indices |
|---|---|---|---|---|---|---|---|
| 1 | None | 15.5$^{100}$ | 11.8$^{100}$ | 8.4$^{100}$ | yes | 2915 | 11.0 |
| 2 | 2 | 12.7$^{100}$ | 8.9$^{100}$ | 16.8$^{100}$ | little | 600 | 53.3 |
| 3 | 5 | 13.3$^{100}$ | 9.3$^{100}$ | 15.7$^{80}$ | little | 1060 | 30.2 |

TABLE II

| Example | Polycarbonate | EEA | Polyethylene | Catalyst (LiOH.H$_2$O) ppm | KI | Notched Izod ($\frac{1}{8}"$ thickness) | Notched Izod ($\frac{1}{4}"$ thickness) | Double Gated Izod | Melt Indices |
|---|---|---|---|---|---|---|---|---|---|
| 1 | 90 | 10 | — | None | 2440 | 16.0$^{100}$ | 10.5$^{100}$ | 3.5$^{100\,H}$ | 13.1 |
| 2 | 90 | 10 | — | 2 | 1575 | 15.7$^{100}$ | 10.0$^{100}$ | 7.8$^{100}$ | 20.3 |
| 3 | 87.5 | 12.5 | — | 2 | 1675 | 15.9$^{100}$ | 10.2$^{100}$ | 3.7$^{100\,H}$ | 19.1 |
| 4 | 90 | 7.5 | 2.5 | 2 | 2100 | 15.3$^{100}$ | 10.7$^{100}$ | 6.1$^{100}$ | 15.2 |
| 5 | 87.5 | 7.5 | 5.0 | 2 | 2720 | 13.5$^{100}$ | 11.3$^{100}$ | 2.8$^{100\,H}$ | 11.8 |
| 6 | 90 | 10 | — | 3 | 2540 | 15.6$^{100}$ | 11.9$^{100}$ | 10.5$^{100}$ | 12.6 |

What is claimed is:

1. A process of molding a polymer admixture with improved compatibility which comprises
   a. preparing an admixture of (i) an aromatic carbonate polymer, (ii) a polyolefin or modified polyolefin in sufficient quantity to impact modify the aromatic carbonate polymer, and (iii) an amount of catalyst sufficient to compatibilize (i) and (ii) selected from the group consisting of hydroxides, oxides and amides of alkali and alkaline earth metals and
   b. molding said admixture.

2. The process of claim 1 wherein the blend is molded in a multiple gated mold.

3. A molded article produced by the process of claim 1.

4. A molded article produced by the process of claim 2.

5. The process of claim 1 wherein the alkali metals are sodium, lithium, and potassium and the alkaline earth metals are calcium, strontium and barium.

6. The process of claim 5 wherein the alkali metals are employed.

7. The process of claim 6 wherein the alkali metal is lithium.

8. The process of claim 6 wherein the alkali metal is sodium.

9. The process of claim 6 wherein the alkali metal is potassium.

10. The process of claim 7 wherein the catalyst is lithium hydroxide or lithium oxide.

11. The process of claim 10 wherein the catalyst is lithium hydroxide.

* * * * *